March 31, 1931. C. E. WESTPHAL 1,799,032
SCRAPER
Filed April 12, 1930 3 Sheets-Sheet 1

C. E. Westphal, INVENTOR
BY Victor J. Evans
ATTORNEY

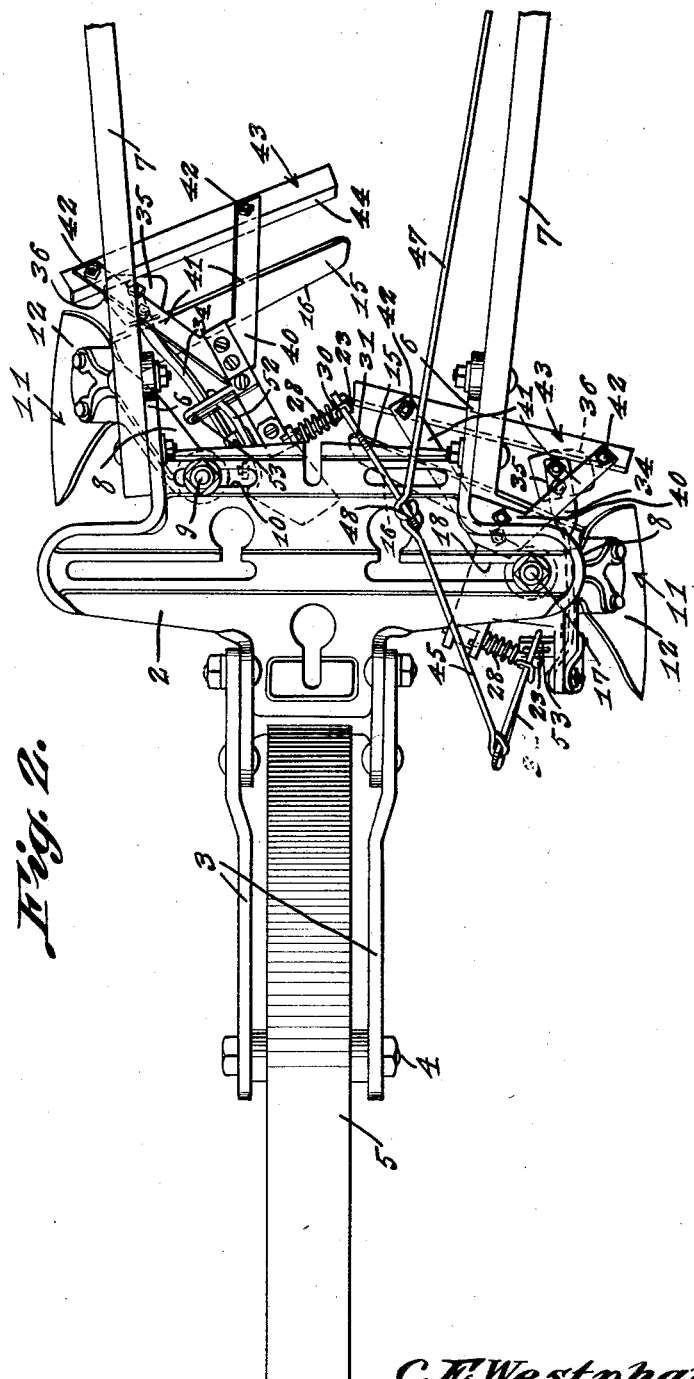

March 31, 1931.  C. E. WESTPHAL  1,799,032
SCRAPER
Filed April 12, 1930  3 Sheets-Sheet 3
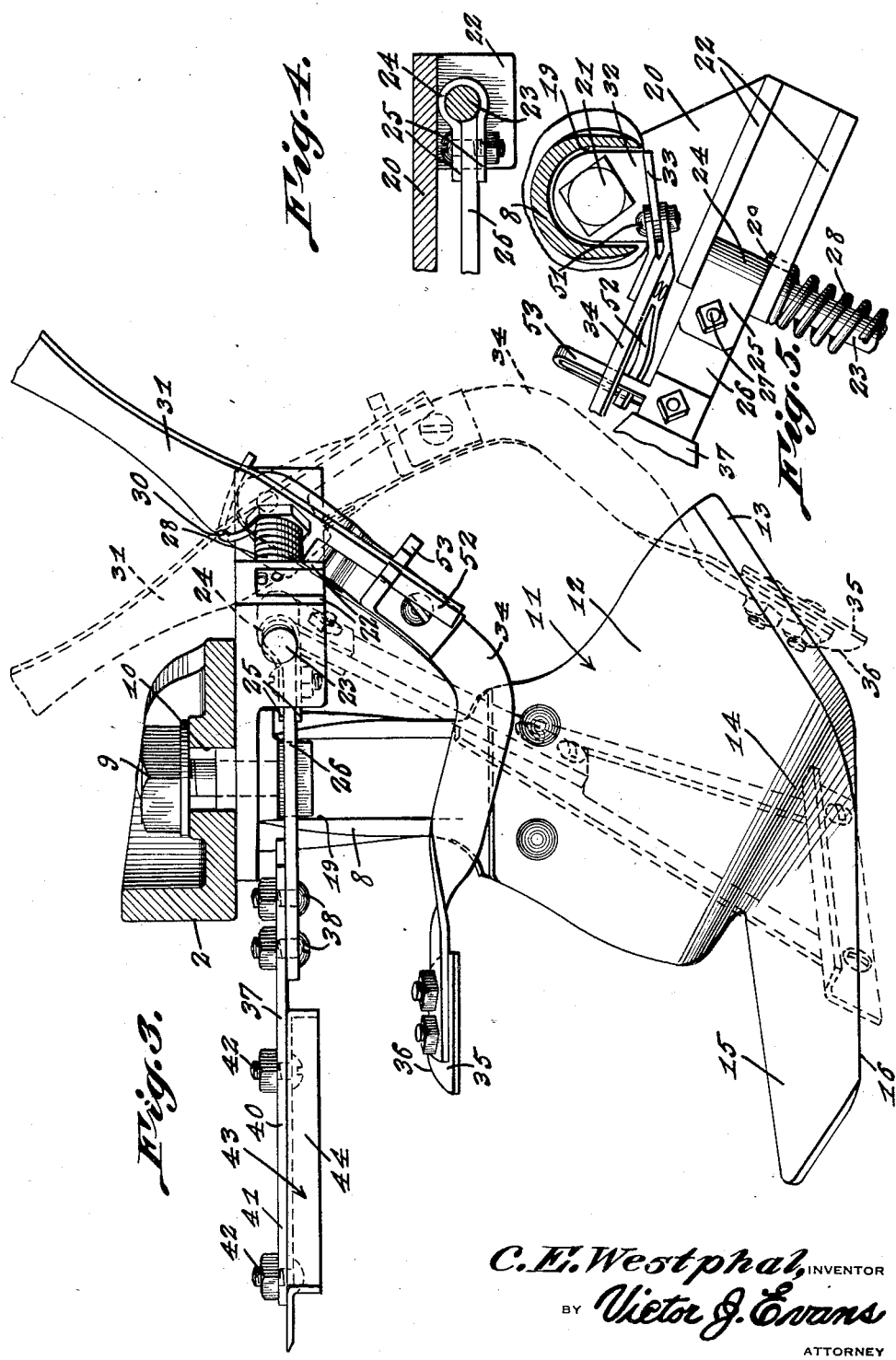
C. E. Westphal, INVENTOR
BY Victor J. Evans
ATTORNEY Patented Mar. 31, 1931

1,799,032

UNITED STATES PATENT OFFICE

CHARLES E. WESTPHAL, OF GARDENVILLE, NEW YORK

SCRAPER

Application filed April 12, 1930. Serial No. 443,834.

This invention relates to improvements in cultivators and more particularly to cultivators of the hand type, and the invention has as its primary object to provide novel means whereby the blades of a cultivator may be readily cleared of accumulations of soil, mud, cut plants, etc. It is a well known fact that in the use of cultivators of this type where no blade clearing or cleaning means is provided, considerable difficulty is experienced and considerable time wasted in manually clearing the blades of such accumulations, and therefore the invention contemplates the provision of means which may be readily operated by a hand which is gripping one of the handles of the cultivator to thoroughly clear the cultivator blades of accumulations without the necessity of stopping the cultivator as is necessary, where this work must be accomplished by hand.

Another object of the invention is to provide, in a cultivator of this type, a novel arrangement of scraping blades for coaction with the surfaces and sharpened edges of the cultivator blades to scrape accumulations from the cultivator blades, the means being automatically restored to its normal position where it will not in any way interfere with the passage of the cultivator blades over or through the soil.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:—

Figure 2 is a top plan view of the cultivator and the device embodying the invention mounted thereon.

Figure 3 is a vertical front to rear sectional view illustrating one of the cultivator blades in detail in elevation and illustrating in full lines the inactive position of the scraping blades and, in dotted lines the positions assumed by the scraping blades of the invention at the end of the scraping operation thereof.

Figure 4 is a detail view partly in elevation and partly in section illustrating the manner in which one of the blades is mounted.

Figure 5 is a view partly in section and partly in bottom plan illustrating means for effecting simultaneous operation of the two scraper blades.

Figure 1:
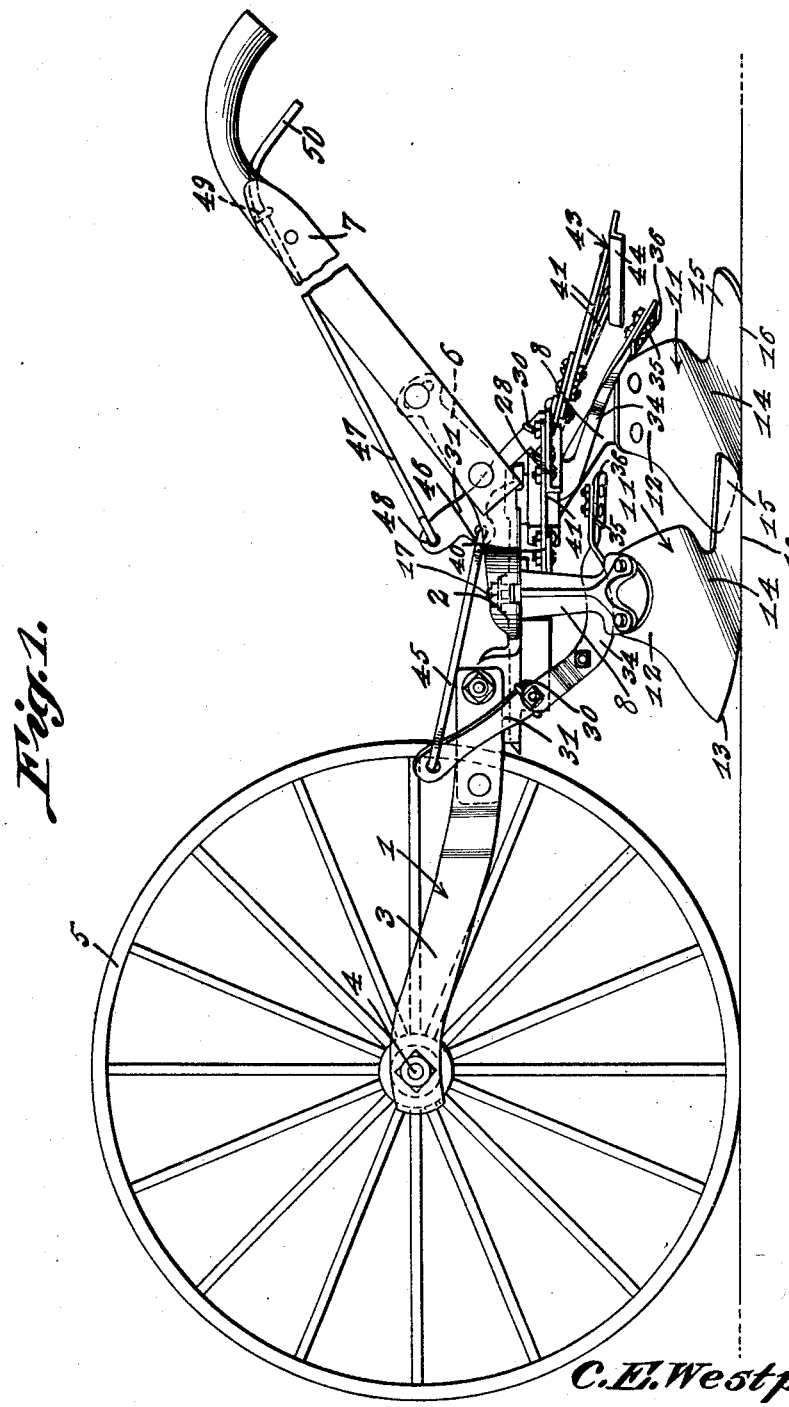
Figure 1 is a view in side elevation of a hand cultivator embodying the invention, the scraping blades being shown in elevated position.

In the drawings the frame of the cultivator is indicated in general by the numeral 1 and comprises a cast body 2 from which frame bars 3 extend and between the forward ends of which bars there is mounted an axle 4 upon which a ground wheel 5 is rotatably mounted. The body member 2 of the frame is provided at its upper side at its rear part with upwardly inclined arms 6 to which the forward ends of the handles of the cultivator, indicated by the numeral 7, are secured.

A stock 8 is mounted upon the body 2 of the cultivator at the right hand side thereof by a bolt 9 which is secured through a transverse slot 10 provided in the said body and mounted at the lower end of this stock is a blade which is indicated in general by the numeral 11 and which comprises an upright portion 12 having its upper end bolted or otherwise secured to the stock at the lower end of said stock. This portion has an inclined cutting forward edge 13 and the lower portion of the blade is curved laterally as indicated by the numeral 14 and provided with an extension 15 having a straight cutting edge 16, it being understood that as the cultivator travels over the surface of the soil, any weeds or brush in the path of the cutting edge 13 of the blade 12 will be severed and the cutting edge of the blade 15 will likewise cut any plants growing in the path of movement of the blade.

This is an ordinary construction of such blades and it will be noted by reference to Figures 1 and 2 of the drawings that the invention contemplates the mounting of such a blade at the right hand side of the body 2 as before described, and the mounting of a corresponding blade at the left hand side of the body, the bolt 17 by which the stock of this latter blade is secured to the body being fitted through a transverse slot 18 in the said body 2, and this slot and therefore the stock upon which the said blade is mounted being located in advance of the slot and blade first described. As the blades are identical in form but oppositely arranged, the foregoing description will apply equally well to both blades.

The stock 8 of each blade is formed in its inwardly presented side with a recess indicated by the numeral 19 and a plate 20 has a portion fitted in this recess and secured by a bolt 21 which is fitted through the slot 10 or the slot 18, above referred to, depending upon which of the blades is to be considered, and for convenience in describing the invention, reference will be had specifically to only one of the cultivator blades, namely the blade 11 and the parts to be associated therewith. The plate 20 is provided upon its under side with a pair of parallel flanges 22 and a shaft 23 is mounted rotatably at one end in openings in these flanges. A clamping collar 24 is fitted about that end of the shaft 23 which extends between the flanges 22, and the collar is provided with extensions 25 which engage the upper and under sides of a bar 26, the collar being secured to this bar and the bar in this manner held upon the shaft 23 for movement therewith by means of a bolt 27.

One end of a coiled spring 28, which spring is fitted upon the shaft 23, is engaged in an opening of one of the flanges 22 as indicated at 29 and the other end of this spring is bent as at 30 for engagement with the rear edge of a lever 31, the lower end of which is fitted upon the other end of the shaft 23 and fixed with respect thereto. Another plate 32 is likewise secured by the bolt 21 in the recess 19 and this plate is provided with a downturned outer portion 33 and secured to this downturned portion is the stock 34 of a scraping blade 35 having a curvilinear edge 36 designed to ride over the laterally curved portion 14 of the blade 11. The numeral 37 indicates the stock of another scraper blade which is held by bolts 38 upon the end of the bar 26, which, as previously stated, is secured upon the shaft 23 and this stock comprises a head 40 and downwardly diverging arms 41 which are bolted at their rear ends 42 to the other scraper blade 43. This scraper blade is flat and preferably provided at its upper edge with an outstanding longitudinal flange 44 whereby it is reinforced and the blade is of a length to extend entirely transversely across the blade 15 when the stock 37 is swung downwardly, through rotation of the shaft 23 by actuation of the lever 31. By reference to Figures 1 and 2 of the drawings, it will be observed that the levers 31 which are associated with each shaft 23 are substantially correspondingly inclined in a forward direction and the connecting rod 45 is pivotally connected at its ends to the said levers and, that end of the rod 45 which is connected to the lever at the right hand side of the cultivator is preferably engaged with an opening in an ear 46 provided upon the said lever, and a rod 47 is pivotally engaged at its forward end as at 48 with the upper end of this one of the two levers and is extended upwardly and rearwardly and guided through an eye member 49 upon the right hand handle 7 of the cultivator and has its rear end portion turned downwardly to provide a hand grip portion 50 located immediately in advance of the hand grip portion of said cultivator handle. At this point it will be understood that when a rearward pull is exerted upon the portion 50 of the rod 47, both of the levers 41 will be swung so as to impart rearward rotary motion to the respective shafts 23 and in order that this may effect a simultaneous downward and forward swinging movement of the two scraping blades, means is provided which will now be described. As shown in Figure 5 of the drawings, the stock 34 is pivotally connected with the downwardly projecting portion 33 of the plate 32 as indicated by the numeral 51 and a finger 52 is movable with the stock 34 at its pivotal end and engages in a guide yoke 53 which is fixed to the bar 26 so that, in the rotation of the shaft 23, in a rearward direction, and against the tension of the spring 28, the stock 37 will be directly swung downwardly through this connection by way of the bar 26 with the shaft, and the downward movement of this bar will cause the guide yoke 53 to coact with the finger 52 to swing the stock 34 of the scraper blade 35 in a downward and rearward direction. In this movement of the parts, the scraper blade 44 will ride at its free edge in scraping contact with the upper side of the portion 15 of each blade 11, and likewise the scraping blade 35 will be caused to ride over the curved surface 14 of the blade and therefore, any mud, soil, or other matter which has accumulated upon the blade comprising the portions 12 and 15, will be removed therefrom.

Before exerting a pull upon the hand piece 50 of the rod 47, the operator of the cultivator will, by grasping both handles, elevate the blades sufficiently to adapt them to clear the surface of the soil. As the springs which are associated with the scraping blades are tensioned in the passage of the blades over the cultivator blades, the parts will be restricted, automatically, to normal position when the hand grip 50 is released.

What I claim is:—

1. In a cultivator of the class described, the combination with a blade having an upright portion the lower part of which is curved laterally and extended to provide a transverse stalk severing blade, of a straight scraping blade for sweeping movement over the upper face of the stalk severing blade, a scraping blade having a curvilinear scraping edge for sweeping movement over the upper face of the curved lower part of the first mentioned blade, means connecting the scraping blades for simultaneous movement, and manually operable means for moving the blades.

2. In a cultivator of the class described, the combination with a blade having an upright portion the lower part of which is curved laterally and extended to provide a transverse stalk severing blade, of a straight scraping blade for sweeping movement over the upper face of the stalk severing blade, a scraping blade having a curvilinear scraping edge for sweeping movement over the upper face of the curved lower part of the first mentioned blade, means connecting the scraping blades for simultaneous movement, manually operable means for moving the blades, and means for automatically returning the said blades to normal position when the manually operable means is released.

3. In a cultivator of the class described, the combination with a blade having an upright portion the lower part of which is curved laterally and extended to provide a transverse stalk severing blade, of a straight scraping blade for sweeping movement over the upper face of the stalk severing blade, a scraping blade having a curvilinear scraping edge for sweeping movement over the upper face of the curved lower part of the first mentioned blade, a shaft, a stock connected with the shaft for movement therewith, the said stock supporting the first mentioned scraping blade, a stock suspended for swinging movement about an axis in alinement with the shaft and supporting the second mentioned scraping blade, coacting means upon the stocks for imparting swinging movement to the stocks in unison with each other, and manually operable means for rotating the shaft.

4. In a cultivator of the class described, the combination with a blade having an upright portion the lower part of which is curved laterally and extended to provide a transverse stalk severing blade, of a straight scraping blade for sweeping movement over the upper face of the stalk severing blade, a scraping blade having a curvilinear scraping edge for sweeping movement over the upper face of the curved lower part of the first mentioned blade, a shaft, a stock connected with the shaft for movement therewith, the said stock supporting the first mentioned scraping blade, a stock suspended for swinging movement about an axis in alinement with the shaft and supporting the second mentioned scraping blade, coacting means upon the stocks for imparting swinging movement to the stocks in unison with each other, manually operable means for rotating the shaft, and means for automatically returning the shaft to normal position upon release of the said manually operable means.

5. In a cultivator of the class described, the combination with a blade having an upright portion the lower part of which is curved laterally and extended to provide a transverse stalk severing blade, of a straight scraping blade for sweeping movement over the upper face of the stalk severing blade, a scraping blade having a curvilinear scraping edge for sweeping movement over the upper face of the curved lower part of the first mentioned blade, a shaft, a stock connected with the shaft for movement therewith, the said stock supporting the first mentioned scraping blade, a stock suspended for swinging movement about an axis in alinement with the shaft and supporting the second mentioned scraping blade, coacting means upon the stocks for imparting swinging movement to the stocks in unison with each other, the said means comprising a finger movable with the second mentioned stock, and a slotted guide upon the first mentioned stock engaging said finger.

In testimony whereof, I affix my signature.

CHARLES E. WESTPHAL.